No. 785,733. Patented March 28, 1905.

UNITED STATES PATENT OFFICE.

WILHELM HESS, OF FRANKFORT-ON-THE-MAIN, GERMANY.

PROCESS OF OBTAINING THE CONTENTS OF YEAST-CELLS.

SPECIFICATION forming part of Letters Patent No. 785,733, dated March 28, 1905.

Application filed October 26, 1901. Serial No. 80,128.

*To all whom it may concern:*

Be it known that I, WILHELM HESS, a citizen of Germany, and a resident of Frankfort-on-the-Main, in the Kingdom of Prussia and Empire of Germany, have invented a certain new and useful Improved Process of Obtaining the Contents of Yeast-Cells, of which the following is a specification.

It has before been proposed to obtain the albumen and the extractive matter or generally the whole contents of the cells from living yeast by allowing the vapor of ether to react upon pressed moist yeast. After a certain time the mass thus treated becomes fluid, the contents of the cells coming out of the cells, and the fluid is then separated from the cell residues by filtration and the albuminous compounds and other extract further separated in a suitable manner.

I have discovered that many organic liquids which are indifferent to the protoplasm of yeast, including ether, have the same physiological attraction or effect upon moist yeast-cells when a comparatively small quantity of the liquid is mixed with the cells and, if required, the mixture stirred or kneaded. In many cases the liquid need be but one to two per cent. of the weight of the moist yeast-cells, and more than five per cent. is never necessary. I have in the course of my investigations experimented with many organic liquids and have produced substantially the same results with all of them, the only material difference in the behavior of the various liquids being the varying time within which they reduce the yeast to fluid. Easily-volatile liquids boiling at low temperature should produce this result in a short time—say from twelve to twenty-four hours—while liquids that are not readily volatilized require a longer time—in some cases several days. This statement, however, is necessarily only approximately correct, because not only the volatility of the liquid, but the extent to which it is soluble in water, as well as the temperature at which the operation is conducted and other conditions, perhaps, appear to be material factors, and also, as is natural, yeasts of different origin show differences in behavior, as do also yeasts of the same origin, but obtained at different times or taken from different vats of the same brewery. In general those liquids are best which are in themselves of the most indifferent nature—that is to say, those which do not easily form chemical compounds with the component parts of the yeast and which boil at a low temperature and can therefore readily be removed by evaporation.

Without attempting to give a complete list of the organic liquids which may be used for the purposes of my invention I may mention ethyl ester of acetic acid, ethyl ether, petroleum ether, benzol, chloroform, and acetic ether, in addition to which the following may also be used with more or less satisfactory results: carbon bisulfid; toluol, xylol, thiophene; acetone and its homologues; glycerin, acetin; the fluorin, chlorin, bromin, and iodin substitution products of the fatty hydrocarbons—such as methyl iodid, carbon tetrachlorid, ethyl bromid, and the like; the esters of formic acid, acetic acid, and their homologues, the liquid esters of all organic acids—such as tartaric acids, oxalic acid, lactic acid, acetoacetic acid, and the like; chloral hydrate, benzylalcohol, anilin, dimethylanilin, phenol, nitrobenzol, and the like.

The following is an illustration of one mode of practicing my invention: Five hundred pounds of pressed moist yeast are mixed with ten pounds ethyl ester of acetic acid in a wooden bath. These two constituents are sufficiently intimately mixed by stirring or kneading at a temperature of 20° Celsius. After the mixture has been effected and after a suitable lapse of time the mass will present a sparkling appearance, and within about two hours it will have softened to a very marked degree. The mixture may now be again stirred or kneaded. After a lapse of about two hours the mixture may again be stirred and, finally, after a similar lapse of time again stirred. The mixture may then stand for from seventeen to twenty hours, when the mass will be found to be a fairly thin liquid, which may be filtered to separate the protoplasm from the empty yeast-cells. The filtered liquid may then be boiled to coagulate the albumen, which is separated by a further filtration, and the filtered liquid or juice is then evaporated to a consistency of treacle. Should separation of the albumen and the residuum or yeast-cells not be desired, the liquefied mass may be boiled directly and the liquid separated by filtration from the empty cells and the coagulated albumen. In this process the ethyl ester of acetic acid may be replaced by equivalently-acting organic liquids, some of which are above stated. Generally, it may be said that such liquids should be indifferent to the protoplasm of the yeast—that is, they should not readily form chemical compound with the protoplasm.

The example given above is a fair illustration of a practical and efficient way of practicing this invention. Variations, particularly in the element of time, may exist when ethyl ester of acetic acid as well as other organic liquids are employed. For instance, a somewhat higher temperature and more persistent or continuous stirring will accelerate the operation. The degree of moisture of the yeast-cells causes also some variation, as does also the character of the yeast—i. e., whether it be quite fresh or hunger yeast.

The period of time may vary, as well as the amount of stirring required, when an organic liquid other than ethyl ester or acetic acid is employed. For these reasons in this case, as in many other chemical processes, it is impossible to state with absolute accuracy all conditions, since they will inevitably vary somewhat, owing to the particular materials employed and the conditions surrounding the operation. In all cases, however, the operator can always tell when the mass has become quite fluid and is ready for the operation described.

I purpose in the appended claims to cover ethyl ester of acetic acid and equivalently-acting organic liquids, some of which I have above recited. I may state that ethyl alcohol is excluded, as it does not operate to liquefy the mass.

I claim as my invention—

1. The process of separating the contents of yeast-cells from the cells which consists in mixing with moist yeast a comparatively small quantity of ethyl ester of acetic acid allowing it to act upon the cells to produce liquefaction of the mass and then separating the liquid constituent thereof from the empty yeast-cells.

2. The process of separating the contents of yeast-cells from the cells by means of a small quantity of an organic liquid indifferent to the protoplasm of yeast which consists in making a mixture of the moist yeast and the organic liquid required for the operation allowing the liquid to act upon the cells to produce liquefaction of the mass and then separating the liquid constituent of the mass from the empty yeast-cells.

Signed at Frankfort-on-the-Main, in the Kingdom of Prussia and Empire of Germany, this 11th day of October, A. D. 1901.

WILHELM HESS.

Witnesses:
  JEAN GRUND,
  CARL GRUND.